Nov. 2, 1937.  M. ESSL  2,098,031
INTERNAL COMBUSTION ENGINE
Filed June 11, 1935  4 Sheets-Sheet 1
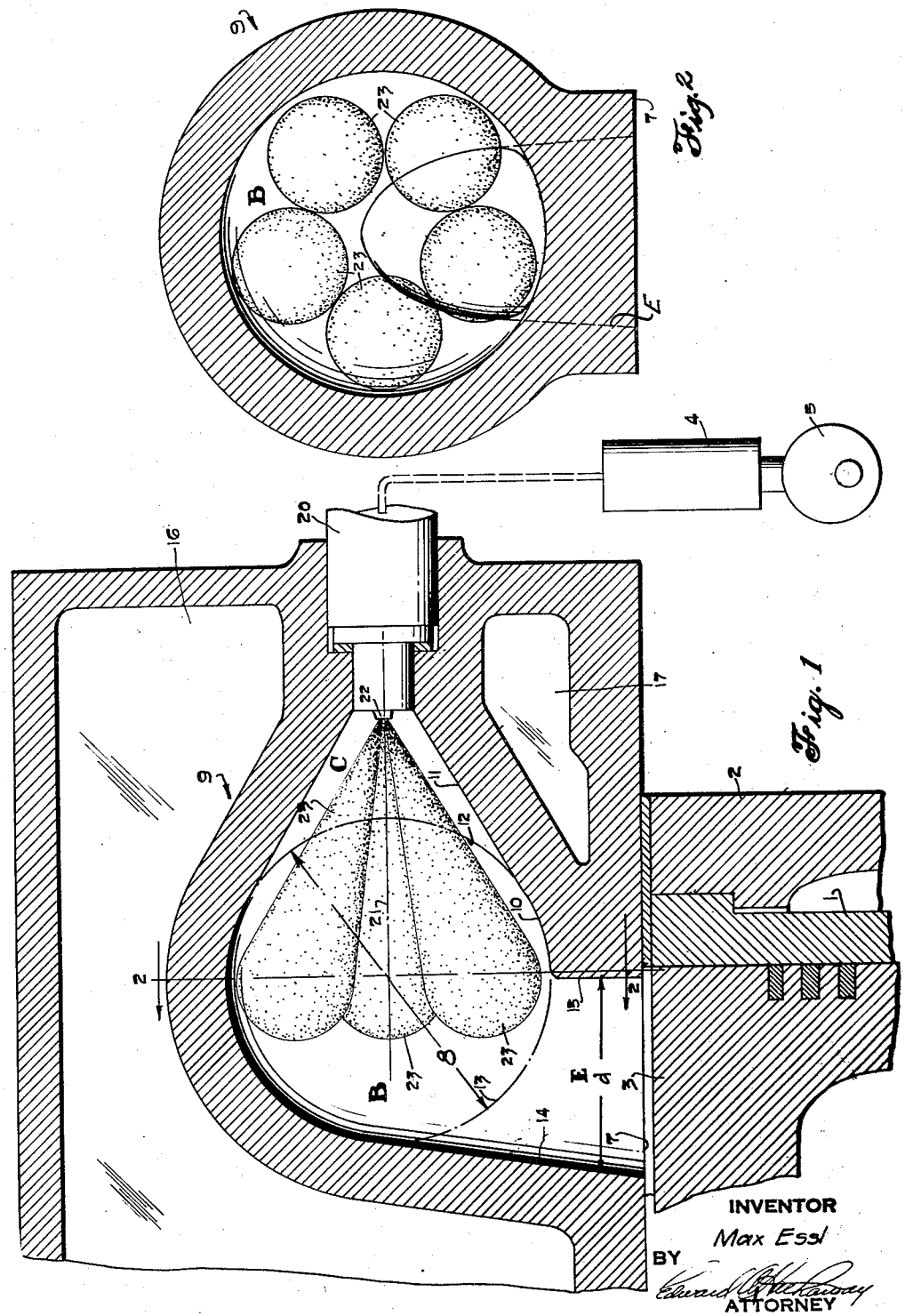

Nov. 2, 1937.  M. ESSL  2,098,031
INTERNAL COMBUSTION ENGINE
Filed June 11, 1935  4 Sheets-Sheet 2
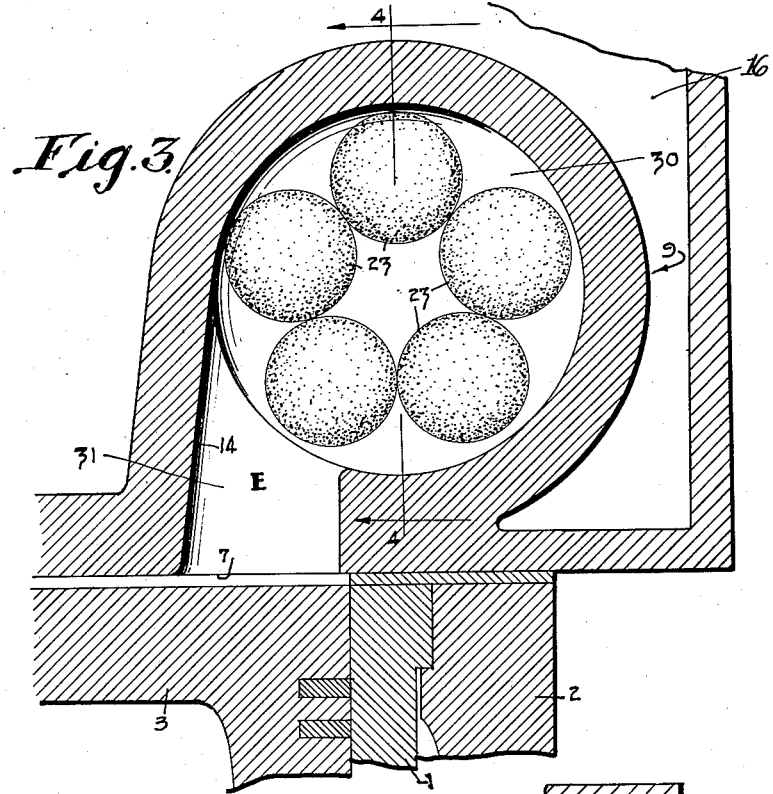
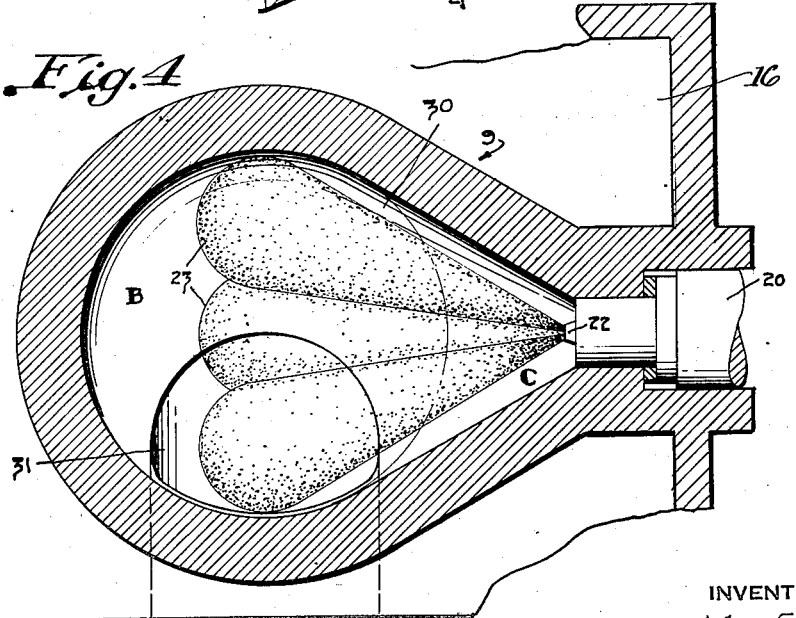
INVENTOR
Max Essl
BY
ATTORNEY

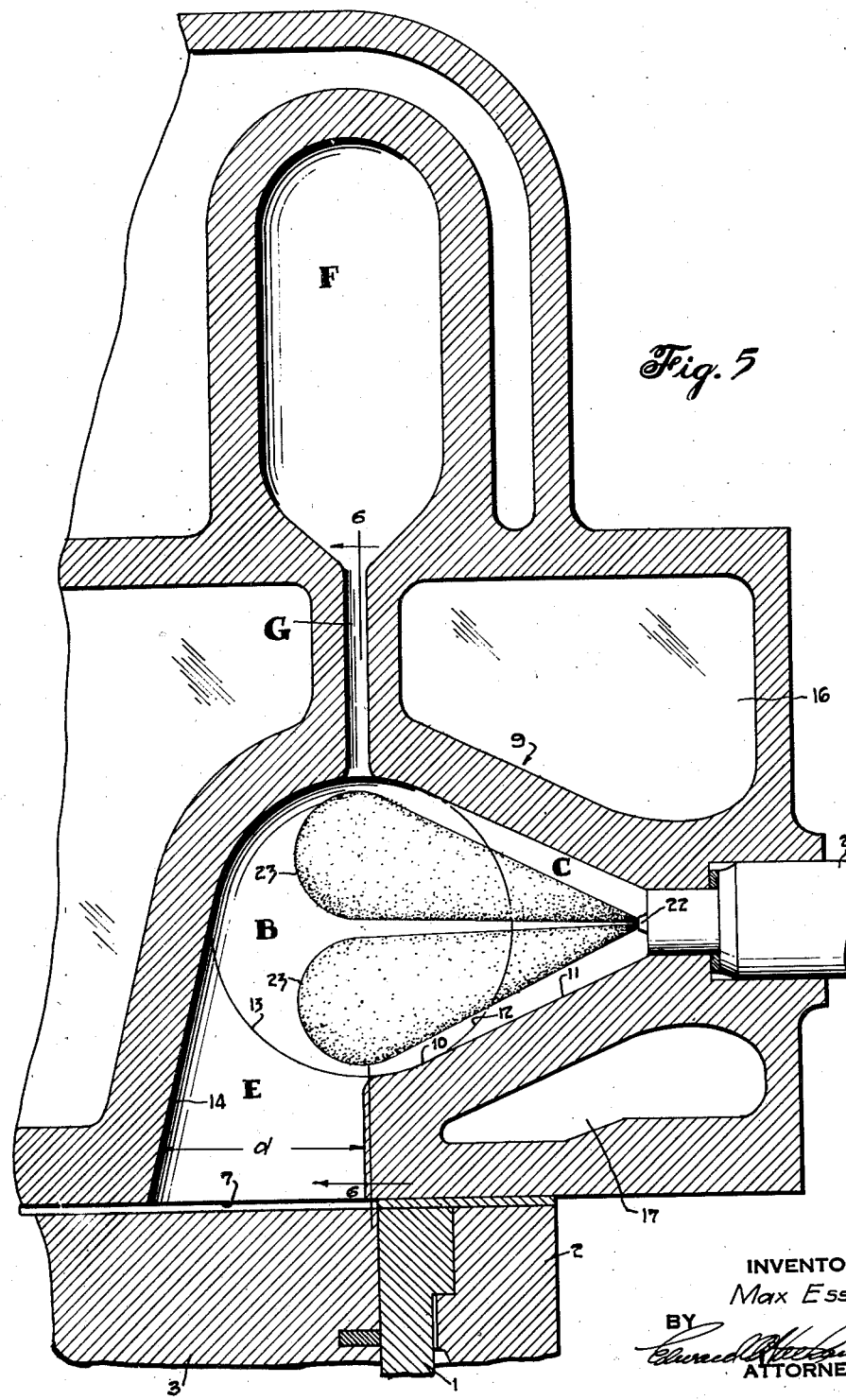

Patented Nov. 2, 1937

2,098,031

UNITED STATES PATENT OFFICE 2,098,031

INTERNAL COMBUSTION ENGINE

Max Essl, Drexel Hill, Pa., assignor to Baldwin-Southwark Corporation, a corporation of Delaware Application June 11, 1935, Serial No. 25,997

7 Claims. (Cl. 123—32)

This invention relates generally to internal combustion engines such as Diesel engines and more particularly to an improved combination of combustion chamber with fuel injection and distribution therein, whereby it is possible to obtain relatively high engine speeds with operating characteristics comparing favorably with those of slow speed engines.

Slow speed Diesel engines have been long developed so as to operate with very high efficiency in fuel consumption and low maintenance cost together with dependability for continuous operation over long periods of time. These desirable qualities are due to lower unit pressures which are conducive to efficient combustion, quiet operation and minimum wear and tear thus insuring long life and dependable service. Slow speed engines, however, are relatively large and expensive for a given horsepower. To reduce the size and cost, Diesel engines of high speeds have been developed but this has been accompanied by a great many problems, especially in that class of high speed engines having upwards of thirty to fifty horsepower per cylinder. One problem with this type engine has been the excessive pressures, difficulty having been experienced in obtaining the desirable pressure characteristics of the slow speed engines together with an acceptable fuel economy and flexibility of operation. These difficulties have persisted notwithstanding countless prior art attempts to overcome the same by providing combustion chambers of special designs and fuel injection arrangements, all intended to create turbulence of air and mixture with the fuel, while in some instances air cells have been suggested in combination with various arrangements of fuel injection. It has been found, however, that such prior attempts have not been fully successful in producing a low maximum pressure and a low pressure rise per each degree of crank angle together with a high mean effective pressure and efficient combustion at high speeds so as to obtain a substantially smokeless exhaust.

It is one object of my invention to provide an improved combustion chamber and an injection and distribution of fuel therein whereby a very efficient turbulence of the air and mixture of fuel is obtained. A further object is to provide an improved combination for effecting a low maximum pressure and a low pressure rise per each degree of crank angle together with efficient combustion when operating under loads at comparatively high speeds and high mean effective pressures.

In the embodiments of my invention I accomplish the foregoing objects by providing a substantially pear-shaped chamber having specifically a large end of preferably spherical form communicating with the engine cylinder through a substantially tangential throat while the small end of the chamber is of conical form as short as possible in approaching the sphere in substantially symmetrical tangency thereto, this in combination with a long period of injection of the fuel at the apex of the cone through a plurality of jets to points of highest turbulence in the sphere free of the wall thereof. The accomplishment of such a long injection period, which it has been found can be as high as 34 to 42°, together with efficient combustion has produced a high speed direct injection Diesel engine having operating characteristics which are comparable to the desirable characteristics of the slow speed Diesel engine. Certain of these operating characteristics are the low maximum pressure and the low pressure rise for each degree of crank angle together with high mean effective pressure and efficient combustion with its substantially smokeless exhaust under loads at high speeds.

Other objects and advantages will be more apparent to those skilled in the art from the following description of the accompanying drawings in which:

Fig. 1 is a vertical section through a portion of a cylinder and cylinder head in which my improved combustion chamber and fuel injection is embodied;

Fig. 2 is a section in line 2—2 of Fig. 1;

Fig. 3 is a section similar to Fig. 1 but showing a modified arrangement of the fuel jets with respect to the combustion chamber;

Fig. 4 is a vertical section taken substantially on the line 4—4 of Fig. 3;

Fig. 5 is a further modification showing an air cell in combination with my improved combustion chamber;

Figure 7:
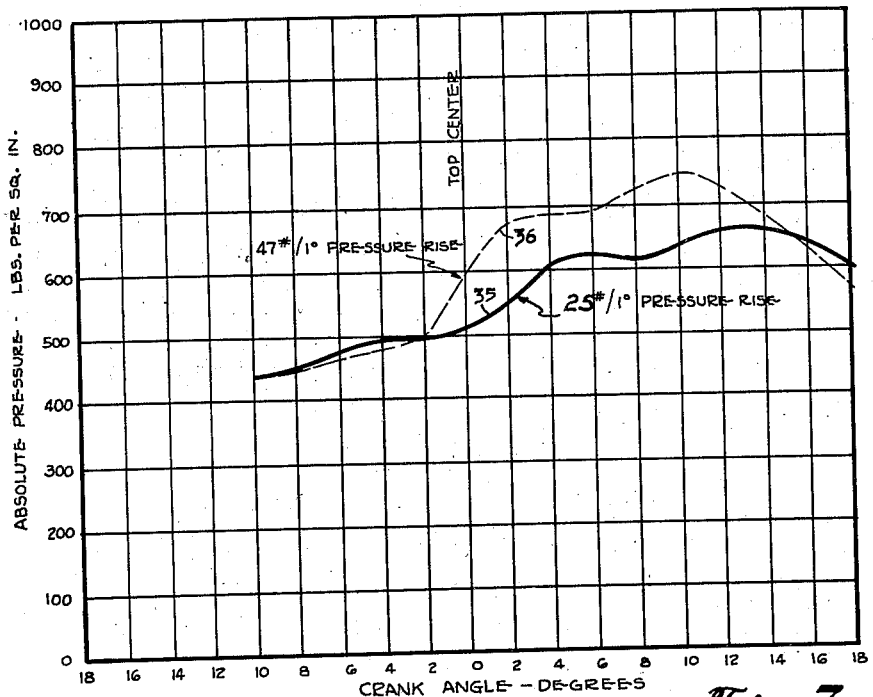
Fig. 7 is a pressure time diagram of an engine in which my invention has been embodied and showing its results contrasted to usual characteristics of high speed engines heretofore developed.

In the particular embodiments of the invention which are disclosed herein merely for the purpose of illustrating certain specific forms among possible others that the invention might take in practice, I have shown in Fig. 1 a cylinder liner 1 supported in any suitable manner in an engine frame 2 while a flat head piston 3 is shown at its top dead center. Other structural features of the engine such as the crankshaft, connecting rods, bearings, and operating mechanism for the valves and fuel injection pump are omitted as these and other usual elements may be of conventional form, although in view of my improved combination having a comparatively long injection period I have diagrammatically indicated a fuel pump and cam therefor at 4 and 5 respectively.

A cylinder head 6 has a flat surface 7 carrying suitable inlet and exhaust valves. Formed in the cylinder head is my improved combustion chamber, generally indicated at 9, of substantially pear-shape formation whose larger end B has preferably a substantially spherical surface 10 of a diameter 8 while the smaller end has a conical wall 11 merging substantially tangentially with the spherical surface. Dot-dash lines 12 and 13 define the theoretical continuations of the spherical surface. It is preferable that the conical wall 11 forms, as shown, a relatively small pocket C. To admit air from cylinder 1 into the combustion chamber, there is provided a throat or passage E preferably circular in cross-section as indicated by the diameter $d$ and whose axis is offset with respect to the center of the sphere. The throat E preferably has one side 14 merging tangentially with the spherical surface 10 at the far end of the chamber to impart maximum whirling air turbulence within the chamber around the outer radial portions of the large end thereof. The other side 15 of the throat intersects the sphere along a vertical line passing approximately through the center of the sphere, although this may vary considerably in practice without departing from the effects of a tangential inlet. It will be noted, however, that the edge 15 overhangs the cylinder wall so as to minimize the passing of combustion gases directly down between the piston and cylinder wall from the combustion chamber. Also the wall 14 is preferably but not necessarily inclined so as to obtain a desired size throat E. As shown in Fig. 2, the throat E is located preferably symmetrical with respect to a vertical line passing through the center of the sphere when viewed in cross-section as indicated by lines 2—2 of Fig. 1. The walls of the combustion chamber 9 are cooled by water circulated through a water jacket 16 which extends down around the under side of the combustion chamber as indicated at 17.

A fuel injector 20 of suitable construction projects through the cylinder head in alignment with the axis 21 of the combustion chamber. The nozzle 22 is arranged to discharge a plurality of jets 23 around the outermost radial portion of the sphere at points of greatest turbulence therein (i. e., radial with respect to the chamber axis), it being noted, however, that the jets as shown in Fig. 1 are so formed as not to impinge upon the wall of the combustion chamber, and it will also be noted that the pocket C is just long enough to permit the jets to be freely directed into the large end of the combustion chamber in symmetrical relation with respect thereto. The outer sides of the jets are preferably substantially parallel to the wall of pocket C.

In combination with the foregoing combustion chamber and fuel distribution therein, I employ a comparatively long injection period up to about 42° crankshaft rotation for full load. The pump cam 5 and pump displacement are so proportioned as to obtain this extended injection period.

It has been found from actual tests of an engine having a 9" bore and a 12" stroke, developing 60 horsepower per cylinder at 850 R. P. M., that for a compression pressure of approximately 500 pounds per square inch a maximum pressure of 670 pounds per square inch is obtained together with a pressure rise of approximately 21 to 27 pounds per 1° of crankshaft rotation. This results in a piston speed of 1700 ft. per minute and mean effective pressure of 81 pounds per square inch, which results compare with a maximum of 1200 ft. per minute for slow speed engines. In addition the maximum fuel injection pressure for my improved system is approximately 3670 pounds per square inch with a spray nozzle setting at 2000 pounds per square inch and an injection period of 42°. Such operating characteristics are highly desirable and are comparable to slow speed engine characteristics. It will be understood that the foregoing specific values are not to be taken as limiting the scope of my invention, as the principles thereof can be applied to a wide range of engine capacities, sizes and speeds. The foregoing information is merely given as illustrative of results which can and have been obtained.

In the modification of Figs. 3 and 4, the relation of pear-shaped chamber 30 to the fuel jets is identical to that shown in Figs. 1 and 2. However, the inlet passage 31 is offset to the side of the spherical end of the chamber rather than at the end thereof as shown in Fig. 1. The result of this arrangement is that the air flows upwardly through the passage 31 and enters chamber 30 in a tangential direction so as to impart a whirling action of air around the cone axis of the chamber. The whirling action both in this modification as well as in the preferred form, is broadly adjacent the outer portion of the large spherical end of the chamber and specifically is adjacent the points where the free ends of the fuel sprays terminate, whereby in each form a controlled turbulence and mixture of fuel and air are obtained by virtue of employing a short conical portion symmetrically connected to the spherical end with the fuel sprays terminating in the outer turbulent regions of the chamber. The result of such whirling action and relation of jets is that each fuel spray is very uniformly mixed with the air.

In connection with Figs. 3 and 4, it will be understood that chambers 30 and 31 correspond to chambers B and E of Figs. 1 and 2.

Figure 6:
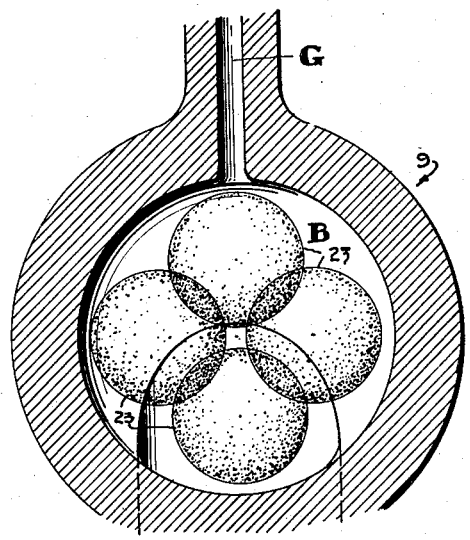
Fig. 6 is a vertical section taken on line 6—6 of Fig. 5.

The modifications shown in Figs. 5 and 6 show the application of an air cell F connected by a relatively long and narrow throat G connecting into my improved type of combustion chamber, it being noted that preferably the passage G communicates substantially with the center of the spherical end of the chamber. The dimensions of passage G are preferably such as to produce a satisfactory rate of air feed to the combustion chamber after the firing has started to take place and during the downward movement of the piston after it passes its center. Also the passage G is positioned so as to intersect the point of highest turbulence within the combustion chamber, it being noted that in the various forms shown, the multiple sprays are at points of highest turbulence in the chamber. The phase of the pressure diagram of the air cell may be offset in regard to the diagram of the main chamber in any desired way merely through variation of the volume of passage G. As above stated, it is preferable to have the pressure in the air cell F lag behind the pressure in the main chamber. As a result, it is possible to increase turbulence and permit a still longer injection period and thus further reduce detonation knock. The air cell may be used with the form of combustion chamber shown in either Figs. 1 or 4.

Merely as illustrative of certain specific aspects of the chamber construction as actually used in practice, and found to produce very satisfactory results, it will be stated that for an engine having a 7" bore and 8" stroke operating preferably from 300 to 1200 R. P. M., the combined volume of spaces E, B and C is approximately 80% of the total compression volume of the engine with diameter of throat $d$ equal to 25% of the piston diameter. The pocket C is preferably kept very small in order that the turbulence of the air in sphere B may be disturbed as little as possible consistent with permitting the plurality of jets to be discharged into the large end of the combustion chamber and terminate freely therein for cooperation with the whirling air at points of maximum turbulence. Five hole fuel injectors were preferably used for this particular chamber with a spray angle of approximately 40°. The combustion chamber and fuel injector seat are water-cooled, thereby differing from that class of injection systems wherein the fuel is discharged into a chamber having a hot surface or is discharged against a hot vaporizing surface in the combustion chamber.

In a similar type of engine but of larger capacity, namely, 9" bore and 12" stroke operating preferably from 250 to 850 R. P. M., the combined volume of chambers E, B and C is approximately 87% of the total compression volume of the engine per cylinder. The diameter $d$ of the throat is the same as before, namely, 25% of the piston diameter, and the pocket C is still kept very small for reasons above given. A seven hole fuel injector is used with a spray angle of 50°. The combustion chamber and fuel ejector seat are also water-cooled and the fuel sprays are injected into the combustion chamber so as not to impinge upon the chamber wall.

Where an air cell F is used, the volume thereof is preferably about 20 to 30% of the combined volume of chambers B, C and E. It is believed preferable that the connecting passage G should have a diameter to length ratio of 1 to 5 or as high as 1 to 15. The volume of this passage is preferably about 2 to 4% of the volume of chamber F depending upon the maximum engine speed. As a result of the foregoing ratios, it is possible to prevent the flame of the combustion travelling into the air cell or of restricting the air flow to too great an extent. By variation of the diameter of connecting passage G, it is possible to offset the phase of the air cell diagram from the main chamber diagram as above pointed out.

As a result of the principles disclosed herein, it has been found that engines of relatively large size and power embodying such principles have very desirable operating characteristics such as shown in the pressure time diagram of Fig. 7. This diagram illustrates by line 35 the actual pressure characteristics obtained in the aforementioned 9 x 12 engine. Said line is contrasted to dotted line 36 representing usual pressure characteristics of an engine having a relatively short injection period of approximately 20°. Pressure characteristics as shown by line 35 are especially advantageous, particularly when efficient combustion is obtained as is the case with applicant's invention. It is thus possible to obtain the desirable features of slow speed Diesel engines including efficient combustion, relatively quiet operation and minimum wear and tear all of which insure long life and dependable service notwithstanding that the engine operates under relatively high speeds for a Diesel engine.

It will of course be understood that various changes in details of construction and arrangement of parts may be made by those skilled in the art without departing from the spirit of the invention as set forth in the appended claims.

I claim:

1. The combination in a compression-ignition internal combustion engine comprising, an engine cylinder, means forming a substantially pear-shaped water cooled combustion chamber having a large end and a relatively short conical portion whose wall merges substantially tangentially with the wall of said large end of the chamber, means for injecting from the small end of said chamber a multiplicity of fuel sprays terminating freely within the outer radial portions of the large end of the chamber in substantially symmetrical relation to the chamber axis, and a passage for admitting air from the engine cylinder to said chamber substantially tangential to the large end thereof, thereby to impart maximum whirling air turbulence within the chamber adjacent the points where the free ends of said fuel sprays terminate.

2. The combination in a compression-ignition internal combustion engine comprising, an engine cylinder, means forming a water cooled combustion chamber having a large end of substantially spherical formation and a smaller end of relatively short conical formation which along its axis is less than substantially one-half of the spherical diameter, the wall of said conical portion merging substantially tangentially and symmetrically with the spherical wall, means for injecting from the small end of the chamber a multiplicity of fuel sprays terminating freely within the outer radial portions of the enlarged end of the chamber in substantially symmetrical relation to the chamber axis, and a passage for admitting air from the engine cylinder to said chamber substantially tangentially to the large end thereof, thereby to impart maximum whirling air turbulence within the chamber adjacent the points where the free ends of said fuel sprays terminate.

3. The combination in a compression-ignition internal combustion engine comprising, an engine cylinder, means forming a water cooled combustion chamber whose major portion is substantially of spherical formation, a fuel injector located substantially symmetrically to said sphere for injecting into said chamber from one side thereof a multiplicity of fuel sprays terminating freely within the outer radial portions of the sphere, and a passage for admitting air from the engine cylinder to said chamber substantially tangentially to said sphere at a location thereof remote from the point of fuel injection so as to impart maximum whirling air turbulence within the chamber adjacent said outer radial portions where the free ends of said fuel sprays terminate.

4. The combination set forth in claim 1 further characterized in that the large end of said chamber is of substantially spherical formation, and the connecting passage communicates directly with that portion of the large end most remote from the point of fuel injection.

5. The combination set forth in claim 1 further characterized in that the connecting passage communicates with the chamber so as to impart a whirling action to the air in a direction around the axis of the chamber.

6. The combination set forth in claim 1 further characterized in that the connecting passage is offset from the engine cylinder wall whereby the cylinder head wall overhangs the cylinder wall around its entire circumference, thereby initially directing heated gases from the combustion chamber to the cylinder free of the walls thereof.

7. The combination set forth in claim 1 further characterized by the provision of means for effecting a relatively long fuel injection period of substantially 34 to 42° starting near the end of the compression stroke.

MAX ESSL.